United States Patent Office 3,598,754
Patented Aug. 10, 1971

3,598,754
PROCESS FOR THE MANUFACTURE OF SUSPENSIONS FOR THE GRANULATION OF FINE, PARTICULATE PHOSPHATE ORE
Ursus Thümmler and Dieter Mandelkow, Hurth, near Cologne, and Bruno Przybylski, Knapsack, near Cologne, Germany, assignors to Knapsack Aktiengesellschaft, Knapsack, near Cologne, Germany
No Drawing. Filed May 3, 1968, Ser. No. 726,603
Claims priority, application Germany, May 12, 1967, K 62,280
Int. Cl. B01j 13/00; C09c 1/56; C21b 1/08
U.S. Cl. 252—313R
7 Claims

ABSTRACT OF THE DISCLOSURE

Sprayable suspensions consisting of the components clay, electrofilter dust originating from the electrothermal production of phosphorus, crude phosphate fine dust and condensed phosphates, for the granulation of fine, particulate phosphate ore are produced by preparing a clay sludge, adding thereto 0.2 to 1.0% by weight, referred to dry clay, of one or more condensed alkali metal phosphates and adding the clay sludge so made to a suspension produced from the further suspension components with the resultant formation of a final suspension with a total solid matter content between 45 and 65% by weight, and with an electrofilter dust content between 15 and 30% by weight and with a clay content between 8 and 30% by weight, the electrofilter dust content and the clay content of the final suspension being referred to its total solid matter content.

---

The present invention relates to a process for the production of a sprayable suspension consisting of the components clay, electrofilter dust originating from the electrothermal production of phosphorus, crude phosphate fine dust and one or more condensed phosphates, for use in the granulation of fine, particulate phosphate ore.

It has already been described that phosphate can be granulated by means of aqueous suspensions containing 35 to 45% solid matter formed of electrofilter dust, clay or bentonite, phosphate suspensions and condensed phosphates, which can be used alone or in combination.

By the addition of phosphate fine dust, it is possible to use smaller proportions of clay and alkali metal phosphate in the suspensions.

The production of suspension mixtures comprising electrofilter dust suspensions and suspensions based on clay, condensed phosphates and phosphate fine dust, is accompanied by the disadvantageous phenomenon of a considerably reduced suspension velocity for the solid clay introduced into the suspension. This phenomenon occurs more particularly when more than 15% by weight electrofilter dust originating from phosphorus furnace off-gases, referred to the total content of solid matter in the suspension, is used. The reasons for this obviously reside in the relatively high concentration of solid matter and in the chemical nature of the filter dust suspension. For example, upon the addition of a given proportion of an electrofilter dust suspension, clay-containing suspensions are found suddenly to become viscous and to be no longer stirrable and pumpable. These factors so disadvantageous for clay suspensions mean commercially inattractive and long preparation periods. The concentration of finely divided clay necessary for pelletizing the suspension is either impossible to produce or with difficulty only, within relatively short periods of time, so that unsuspended clay must be sieved out and rejected. It is clear, however, that for reasons of economy and waste-water disposal it is highly desirable to use in the suspension to be granulated all of the electrofilter dust originating from the production of phosphorus.

It has now unexpectedly been found that the disadvantageous phenomena accompanying earlier processes can be obviated and that granulation suspensions combining a high content of electrofilter dust with a corresponding content of clay can be produced in simple and rapid fashion given addition of a clay sludge with a high content of solid matter to a suspension produced from the further suspension components.

The present invention relates more particularly to a process for the production of a sprayable suspension having a total solid matter content between 45 and 65% by weight, preferably between 50 and 60% by weight, an electrofilter dust content between 15 and 30% by weight and a clay content between 8 and 30% by weight, the electrofilter dust content and the clay content being referred to the total solid matter content of the suspension, which process comprises preparing a clay sludge, adding thereto 0.2 to 1.0% by weight, referred to dry clay, of one or more condensed alkali metal phosphates, and adding the clay sludge so produced to a suspension made from the further suspension components specified above.

The solid matter content in the clay sludge is preferably selected between 35 and 60% by weight and water and/or scrubbing water coming from wet dust collectors associated with phosphate ore-dressing installations is added. The water and/or scrubbing water receiving the clay for preparation of the sludge, should preferably have a temperature between 40 and 90° C.

An exemplary mode of producing the sludge comprises introducing with agitation and while pumping 35 to 60 kg. clay, which may have been crushed earlier, into 65 to 40 kg. water and/or scrubbing water coming from wet dust collectors of a phosphate ore-dressing installation, incorporating with the resulting sludge 0.2 to 1.0% by weight, referred to dry clay, of one or more condensed sodium phosphates and, after all of the clay and of the alkali metal phosphates have been added, continuing agitation for a further 0.5 to 2 hours and finally adding the sludge to a suspension produced from the further suspension components.

The production of aqueous clay or bentonite suspensions containing up to 45% by weight solid matter has already been described in literature. However, nobody skilled in this art would have expected clay suspensions with a solid matter content of more than 45% by weight, for example 50 to 60% by weight, to be obtainable in flowable, pumpable and even sprayable form by the addition of 0.2 to 1% by weight, referred to dry clay, of one or more condensed alkali metal phosphates. To this effect, there can be used the by-products which are obtained in the production of phosphate salts and which may contain pyrophosphates, tripolyphosphates or higher-condensed phosphates.

The fact that the addition of so slight proportions of condensed phosphates influences the viscosity of the clay slime is an unexpected result bearing in mind that, for example, the alkali metal orthophosphates, chlorides, sulfates, nitrates, phosphites, carbonates, hydroxides or $H^+$-ions could not be found to produce such an effect.

A clay sludge containing between 45 and 65% by weight solid matter, capable of being stirred and pumped, is most advantageously prepared in the following manner:

Clay crushed earlier in a round screen charging means to particles 8 mm. in diameter and about 50 mm. long, is introduced with agitation and while pumping into water and/or scrubbing water coming from the wet dust collectors of a phosphate-dressing installation, the scrubbing water containing between about 2 and 5% by weight solid matter. The suspension is cycled by means of a rotary pump or—for rapid comminution of lumpy clay—by means of an oblique disc pump. No precomminution in a round screen charging means is necessary when an oblique disc pump is employed. In this event, the clay need only be subjected to simple reel comminution to obtain particles with dimensions between 50 x 70 x 30 mm. and 70 x 100 x 40 mm.

Once the clay has been added, the whole is stirred and pumped for a period of 1 to 2 hours, depending on the clay's quality. The use of an oblique disc pump enables this period to be shortened by about 50%. The clay sludge is capable of being stored with agitation and can be added to the suspension mixture according to requirements.

The present invention offers the following advantages:

The clay added as a clay sludge appears in most finely divided form in the suspension mixture and is fully effective.

In the case of phosphate difficult to granulate, for example, it is possible to increase the clay content in the suspension mixture without any difficulty being encountered in suspending the clay. Nor are longer periods necessary for the preparation of the suspension.

No difficulties are encountered upon the addition of clay to suspension mixtures containing more than 15% by weight electrofilter dust, referred to the total solid matter content of the suspension, and the removal or rejection of lumpy clay later in the process upon screening of the suspension mixture is avoided.

The present process furthermore enables up to 40% of clay to be economized where readily pelletizable phosphate is concerned.

Still further, it is possible to use suspension mixtures which combine a total concentration of solid matter between 45 and 65% by weight, preferably between 50 and 60% by weight, with good stirability, pumpability and sprayability, i.e. with the factors so favorable for the shaping of so-called green pellets and for their stability.

The following examples describe the preparation of typical clay sludge and suspension batches.

EXAMPLE 1

(Preparation of a clay sludge with 50% by weight solid matter)

A suspension container having a capacity of 18 cubic meters, provided with an intense stirrer and a pumping means, was charged with 7 cubic meters scrubbing water of about 60° C. with a solid matter content of about 3% by weight, coming from the wet dust collectors of a phosphate-dressing installation, and with 2 cubic meters scrubbing water containing about 40 kg. $Na_5P_3O_{10}$/cubic meter, coming from the off-gas scrubbing one of a sodium polyphosphate installation, and was charged later with 16 tons particulate clay (particles 8 mm. in diameter and about 50 mm. long) containing 20 to 22% by weight water. Once the clay had been added, the whole was stirred and pumped for 90 minutes. The resulting clay sludge was found to have a density of 1.43, corresponding to a solid matter content of 50% by weight.

EXAMPLE 2

(Preparation of a suspension mixture with a solid matter content of 55% by weight using 16% by weight electrofilter dust, referred to the total solid matter content of the suspension mixture)

A suspension container having a capacity of 18 cubic meters, provided with an intense stirrer was used. The apparatus contained 2.9 tons of a suspension mixture from a preceding batch, the suspension mixture having a density of 1.46 grams/cubic centimeter and containing 55% by weight solid matter (=1.6 tons solid matter). There were added:

7.3 tons of an electrofilter dust suspension with a density of 1.21 grams/cubic centimeter and a solid matter content of 30% by weight (=2.2 tons solid matter), 3.2 tons of alkali metal phosphate scrubbing water coming from the off-gas scrubbing zone of a sodium tripolyphosphate installation, the water having a density of 1.08 grams/cubic centimeter (=0.8 ton solid matter), 3.4 tons of a clay sludge with a solid matter content of 44% by weight and with a density of 1.37 grams/cubic centimeter (=1.5 tons solid matter), and 8.3 tons of phosphate fine dust.

The batch gave 25.1 tons of a suspension mixture with a density of 1.46 grams/cubic centimeter and a solid matter content of 55% by weight, (=13.8 tons solid matter).

EXAMPLE 3

(Preparation of a suspension mixture with a solid matter content of 52% by weight using 27% by weight electrofilter dust, referred to the total solid matter content of the suspension mixture)

A suspension container having a capacity of 18 cubic meters, provided with an intense stirrer was used. The apparatus contained 2.8 tons of a suspension mixture from a preceding batch, the suspension mixture having a density of 1.43 grams/cubic centimeter and containing 52% by weight solid matter (=1.5 tons solid matter).

There were added:

11.2 tons of an electrofilter dust suspension with a density of 1.24 grams/cubic centimeter and a solid matter content of 32% by weight (=3.6 tons solid matter), 1.6 tons of alkai metal phosphate scrubbing water coming from the off-gas scrubbing zone of a sodium tripolyphosphate installation, the water having a density of 1.10 grams/cubic centimeter (=0.1 ton solid matter), 2.9 tons of a clay sludge with a density of 1.43 grams/cubic centimeter and a solid matter content of 50% by weight (=1.4 tons solid matter), and 6.5 tons of phosphate fine dust.

The batch gave 25.0 tons of a suspension mixture with a density of 1.43 grams/cubic centimeter and a solid matter content of 52% by weight (=13.1 tons solid matter).

EXAMPLE 4

(Preparation of a suspension mixture with a solid matter content of 50% by weight using 29% by weight electrofilter dust, referred to the total solid matter content of the suspension mixture)

A suspension container having a capacity of 28 cubic meters, provided with an intense stirrer was used. The apparatus contained 2.8 tons of a suspension mixture from a preceding batch, the suspension mixture having a density of 1.40 grams/cubic centimeter and containing 50% by weight solid matter (=1.4 tons solid matter).

There were added:

12.0 tons of an electrofilter dust suspension with a density of 1.20 grams/cubic centimeter and a solid matter content of 30% by weight (=3.6 tons solid matter), 1.1 tons of alkali metal phosphate scrubbing water coming from the off-gas scrubbing zone of a sodium tripolyphosphate installation, the water having a density of 1.20 grams/cubic centimeter (=0.1 ton solid matter), 2.6 tons of a clay sludge having a density of 1.31 grams/ cubic centimeter and a solid matter content of 40% by weight (=1.0 ton solid matter) and 6.3 tons of phosphate fine dust.

The batch gave 24.8 tons of a suspension mixture with a density of 1.40 grams/cubic centimeter and a solid matter content of 50% by weight (=12.4 tons solid matter).

We claim:

1. In the process for the manufacture of sprayable suspensions consisting of the components clay, electrofilter dust originating from the electrothermal production of phosphorus, crude phosphate fine dust and condensed phosphates, for the granulation of fine, particulate phosphate ore, the improvement which comprise preparing a clay sludge, adding thereto 0.2 to 1.0% by weight, referred to dry clay, of a condensed alkali metal phosphate and adding the clay sludge so made to a suspension produced from the further suspension components with the resultant formation of a final suspension having essentially a total solid matter content of between 45 and 65% by weight of which solid matter 15 to 30% by weight is electrofilter dust and 8 to 30% by weight is clay, the electrofilter dust content and the clay content of the final suspension being referred to its total solid matter content.

2. The process of claim 1, wherein the final suspension has a total solid matter content between 50 and 60% by weight.

3. The process of claim 1, wherein the clay sludge has a solid matter content between 35 and 60% by weight.

4. The process of claim 1, which comprises producing the clay sludge by means of water and/or scrubbing water coming from wet dust collectors of a phosphate ore-dressing installation.

5. The process of claim 4, wherein the water and/or scrubbing water used for making the clay sludge has a temperature between 40 and 90° C.

6. The process of claim 1, which comprises introducing with agitation and while pumping 35 to 60 kg. clay into 65 to 40 kg. water and/or scrubbing water coming from wet dust collectors of a phosphate ore-dressing installation, mixing the resulting sludge with 0.2 to 1.0% by weight, referred to dry clay, of a condensed sodium phosphate and, after all of the clay and of the alkali metal phosphate have been added, continuing agitation for a further 0.5 to 2 hours, and finally adding the sludge to a suspension containing the further suspension components.

7. The process of claim 6, wherein crushed clay is used.

References Cited

UNITED STATES PATENTS

| | | | |
|---|---|---|---|
| 2,164,950 | 7/1939 | Schulze | 75—3 |
| 2,233,867 | 3/1941 | Howe | 252—313X |
| 2,379,100 | 6/1945 | Partridge | 252—313X |

RICHARD D. LOVERING, Primary Examiner

U.S. Cl. X.R.

75—3; 106—286; 264—117